N. EARLYWINE.
Planter and Cultivator.
No. 107,235. Patented Sept. 13, 1870.
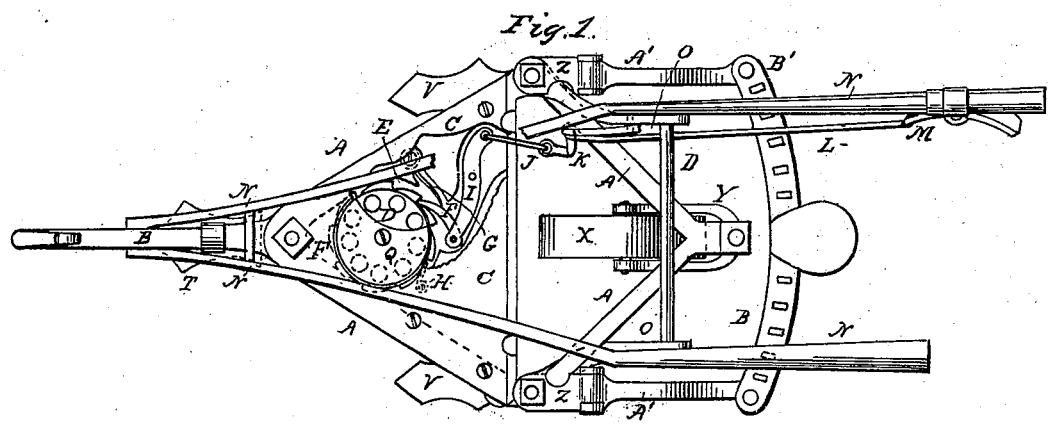
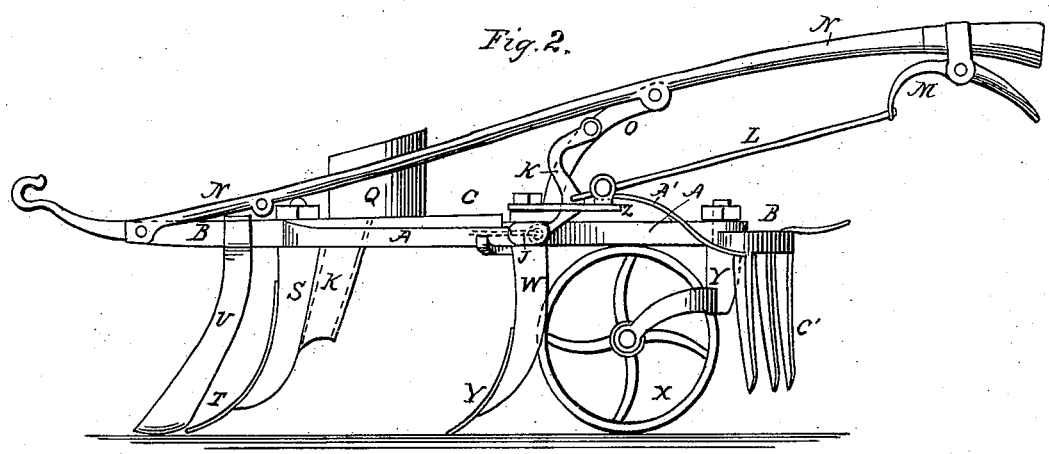
Witnesses:
Inventor.

United States Patent Office.

NATHAN EARLYWINE, OF CENTREVILLE, IOWA.

Letters Patent No. 107,235, dated September 13, 1870.

---

IMPROVEMENT IN PLANTER AND CULTIVATOR.

---

The Schedule referred to in these Letters Patent and making part of the same.

---

*To all whom it may concern:*

Be it known that I, NATHAN EARLYWINE, of Centreville, in the county of Appanoose and State of Iowa, have invented a new and improved Planter and Cultivator; and I do hereby declare that the following is a full, clear, and exact description thereof, which will enable others skilled in the art to make and use the same, reference being had to the accompanying drawing forming part of this specification, in which—

Figure 1 is a top view of my improved planter and cultivator, parts being broken away to show the construction.

Figure 2 is a side view of the same.

My invention has for its object to furnish an improved machine, simple in construction, and effective in operation, and which may be readily adjusted for use as a corn-planter or cultivator, as may be desired, doing its work well in either capacity; and It consists in the construction and combination of the various parts of the machine, as hereinafter more fully described.

A is the frame of the machine, which is made somewhat diamond-shaped in its general form, and to the forward corner or handle of which is attached or upon it is formed the draft-bar B, having a hook upon its forward end, for the convenient attachment of the draft.

To the forward half of the frame A is attached a double platform, C, in a recess, between the parts of which is pivoted the circular dropping-plate D, in which is formed a circle of holes, each of such a size as to contain enough corn for a hill.

Around the circumference of the dropping-plate D are formed ratchet-teeth E, upon which the engaging end of the pawl F takes hold to revolve the said dropping-plate to drop the seed.

The pawl F is held forward against the plate D by the spring G, as shown in fig. 1.

H is a spring, attached to the platform C in such a position as to rest against the ratchet-teeth E with sufficient force to prevent the dropping-wheel D from being moved back by the friction of the pawl F as it is drawn back for another stroke.

The pawl F is pivoted to the forward end of the lever I, placed in a recess between the parts of the platform C, and pivoted at or near its middle part to said platform.

To the outer end of the lever I is attached one end of the connecting-rod J, the other end of which is attached to the lower end of the lever K, the upper end of which is pivoted to one of the uprights that support the handles.

To the lever K is attached the forward end of the connecting-rod L, the rear end of which is attached to the forward end of the lever M, which is pivoted to a support attached to one of the handles, and its rear end extends back into such a position that it may be reached and operated by the driver without removing his hand from the hand-piece of said handle.

N are the handles, the forward ends of which are attached to the draft-bar B or forward end of the frame A, and their rear ends are supported at the proper elevation by the uprights O, the lower ends of which are attached to the frame A, at or near its side angles.

The handles N are connected and held at the proper relative distance apart by the round P.

Q is the seed-hopper, which is attached to the platform C, directly over the dropping-plate D. Part of the bottom of the hopper Q is cut away, as shown in fig. 1, to allow the seed to come in contact with the dropping-plate D, and enter the holes in the said plate.

As the plate D is revolved by operating the pawl E, the seed in the holes of the plate D is carried beneath the bottom of the hopper Q, and as each hole in succession comes over the upper end of the conductor-spout R, the seed drops into said spout, and is conducted to the ground.

The spout R is connected with the rear side of the standard S, to the lower end of which the furrowing-plow T is attached, so that the seed may be conducted into the bottom of the furrow opened by said plow.

The upper end of the standard S passes through a hole in the frame A, at or near its forward angle, has a screw-thread cut upon it, and is secured in place by a nut, as shown in figs. 1 and 2.

U is a cutter, attached to the frame A or draft-bar B, directly in front of the plow-standard S, and which is designed to cut off any roots that might obstruct the plow T.

V are the covering-plows, which are attached to the lower ends of the two standards W, the upper ends of which pass up through holes in the frame A, at or near its side angles or corners, have screw-threads cut upon their upper ends, and are secured in place by nuts, as shown in figs. 1 and 2.

X is a wheel, pivoted to the forked lower end of the standard Y, the upper end of which passes up through a hole in the rear angle of the frame A, has a screw-thread cut upon it, and is secured in place by a nut, as shown in figs. 1 and 2.

To the side angles of the frame A, or to the upper ends of the plow-standard W, are attached two plates or arms, Z, to the rear ends of which are pivoted or hinged the forward ends of the bars A', the rear ends of which are attached to the ends of the curved bar or beam B'.

To the beam or bar B' are attached the upper ends of the teeth C', a space being left free from teeth at the central part of said beam, to allow the row of plants to pass through or to prevent the seed from being disturbed by the teeth, when used for cultivating the ground at the same time that the seed is planted.

Having thus described my invention,

I claim as new and desire to secure by Letters Patent—

1. The combination of the double platform C, circular dropping-plate D, ratchet-teeth E, pawl F, springs G and H, lever I, connecting-rod J, lever K, connecting-rod L, and hand-lever M with each other and with the handle N, frame A, and seed-hopper Q, substantially as herein shown and described, and for the purpose set forth.

2. The combination of curved bar or beam B', teeth C', hinged arms A', and plates Z with the frame A, substantially as herein shown and described, and for the purpose set forth.

3. The combination and arrangement of the cutter U, furrowing-plow T S, conductor-spout R, and covering-plows V W, with the frame A and seed-dropping device, substantially as herein shown and described, and for the purpose set forth.

NATHAN EARLYWINE.

Witnesses:
   John P. Ullrich,
   William Payton.